(12) United States Patent
Leone et al.

(10) Patent No.: US 12,459,493 B2
(45) Date of Patent: Nov. 4, 2025

(54) SYSTEM AND METHOD FOR BRAKE ASSISTED VEHICLE TURNING RADIUS REDUCTION

(71) Applicant: FORD GLOBAL TECHNOLOGIES, LLC, Dearborn, MI (US)

(72) Inventors: Thomas Leone, Ypsilanti, MI (US); Aed M Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 18/110,424

(22) Filed: Feb. 16, 2023

(65) Prior Publication Data

US 2024/0278771 A1    Aug. 22, 2024

(51) Int. Cl.
*B60W 30/045* (2012.01)
*B60W 40/068* (2012.01)

(52) U.S. Cl.
CPC ........ *B60W 30/045* (2013.01); *B60W 40/068* (2013.01); *B60W 2520/28* (2013.01); *B60W 2540/18* (2013.01); *B60W 2554/80* (2020.02); *B60W 2710/18* (2013.01)

(58) Field of Classification Search
CPC ............ B60W 30/045; B60W 40/068; B60W 2520/28; B60W 2540/18; B60W 2710/18; B60W 30/18145; B60T 8/1755
See application file for complete search history.

(56) References Cited

U.S. PATENT DOCUMENTS

| 5,742,917 | A | 4/1998 | Matsuno | |
|---|---|---|---|---|
| 6,227,626 | B1 * | 5/2001 | Blattert | B60T 17/221 303/122.08 |
| 7,308,350 | B2 * | 12/2007 | Brown | B60T 8/1766 701/80 |
| 8,781,686 | B2 | 7/2014 | Suzuki et al. | |
| 10,392,018 | B1 * | 8/2019 | Rhodes | B60L 58/25 |
| 2005/0049774 | A1 * | 3/2005 | Kogure | B60W 40/068 73/9 |
| 2005/0102085 | A1 * | 5/2005 | Sakata | B60T 8/172 701/72 |
| 2005/0206231 | A1 * | 9/2005 | Lu | B60W 30/02 303/146 |
| 2005/0209763 | A1 * | 9/2005 | Offerle | B60W 10/18 701/90 |

(Continued)

FOREIGN PATENT DOCUMENTS

FR    3005000 A1    10/2014
JP    S63154428 A    6/1988

*Primary Examiner* — Phutthiwat Wongwian
*Assistant Examiner* — Brian R Kirby
(74) *Attorney, Agent, or Firm* — Burr & Forman; Lorne Forsythe (57) ABSTRACT

A vehicle control system for reducing turn radius of a vehicle may include a speed sensor to determine a vehicle speed, a steering angle sensor to determine turn angle, and a controller operably coupled to the speed sensor and the steering angle sensor to determine a tight turn event based on the vehicle speed and the turn angle, responsive to the tight turn event, determine driving surface information for a surface on which the vehicle is operating, and set a target speed for an inside rear wheel of the vehicle during a turn causing the determination of the tight turn event based on the driving surface information.

18 Claims, 6 Drawing Sheets

(56) References Cited

U.S. PATENT DOCUMENTS

| | | | |
|---|---|---|---|
| 2008/0059034 A1* | 3/2008 | Lu | B60T 8/17552 |
| | | | 701/41 |
| 2008/0086248 A1* | 4/2008 | Lu | B60W 40/101 |
| | | | 701/41 |
| 2009/0014226 A1* | 1/2009 | Grougan | B60W 30/18145 |
| | | | 180/197 |
| 2013/0204472 A1* | 8/2013 | Pfefferl | B60W 20/00 |
| | | | 701/22 |
| 2014/0058643 A1* | 2/2014 | Kodama | B60K 17/20 |
| | | | 701/82 |
| 2016/0318509 A1* | 11/2016 | Rycroft | B60T 8/1755 |
| 2017/0015311 A1* | 1/2017 | Zin | B60W 40/072 |
| 2017/0190330 A1* | 7/2017 | Kelly | B60W 30/02 |
| 2018/0141550 A1 | 5/2018 | Kelly | |
| 2019/0100191 A1* | 4/2019 | Kikkawa | G07C 5/0808 |
| 2019/0111932 A1* | 4/2019 | Falconer | B60W 30/18045 |
| 2020/0148255 A1 | 5/2020 | Korsch et al. | |
| 2021/0197820 A1 | 7/2021 | Keller | |
| 2021/0252976 A1 | 8/2021 | Nahrwold | |
| 2022/0118979 A1 | 4/2022 | Pursifull | |
| 2022/0306194 A1 | 9/2022 | Korsch et al. | |

\* cited by examiner

SYSTEM AND METHOD FOR BRAKE ASSISTED VEHICLE TURNING RADIUS REDUCTION

TECHNICAL FIELD

Example embodiments generally relate to vehicle control technology and, more particularly, relate to a system and method for providing a reduced vehicle turning radius.

BACKGROUND

Vehicles with a relatively long wheelbase, such as trucks, often also have large turning radiuses. This can make such vehicles difficult to park or maneuver in relatively tight spaces. Such vehicles may also struggle to complete a U-turn in certain situations. Larger front wheel drive vehicles may also face similar issues.

Accordingly, it may be desirable to define a strategy for providing turning radius reduction that can be implemented to provide a more satisfying user experience for drivers of these and other vehicles.

BRIEF SUMMARY OF SOME EXAMPLES

In accordance with an example embodiment, a vehicle control system for a vehicle may be provided. The system may include a speed sensor to determine a vehicle speed, a steering angle sensor to determine turn angle, and a controller operably coupled to the speed sensor and the steering angle sensor to determine a tight turn event based on the vehicle speed and the turn angle, responsive to the tight turn event, determine driving surface information for a surface on which the vehicle is operating, and set a target speed for an inside rear wheel of the vehicle during a turn causing the determination of the tight turn event based on the driving surface information.

In another example embodiment, a method of providing automated application of turn radius reduction in a driver assist mode is provided. The method may include determining a vehicle speed via a speed sensor, determining turn angle of the vehicle, determining a tight turn event based on the vehicle speed and the turn angle, responsive to the tight turn event, determining driving surface information for a surface on which the vehicle is operating, and setting a target speed for an inside rear wheel of the vehicle during a turn causing the determination of the tight turn event based on the driving surface information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define strategies that enable turning radius reduction for large vehicles. That said, strategies that may work in a large vehicle context may also work for other vehicles. Thus, example embodiments are not strictly limited to application in large vehicles.

It may be possible to use the application of a selected torque to, or providing torque control, to the inside rear wheel during a turn in order to assist in turning radius reduction. When the selected torque involved application of a negative torque via the application of braking forces, the event is what is often referred to as brake-steer, or brake-assisted turning. Although such brake-assisted turning in general terms is already known, its application in current contexts (e.g., on four wheel drive vehicles) has been noted to increase the rate of wear on the tires of the vehicle. Moreover, such systems have generally been fairly complicated and, particularly for electric vehicles (EVs), may consequently consume power at a faster rate and thereby negatively affect vehicle range.

Accordingly, it may be desirable to provide a system capable of bettering the performance of brake-steer or brake-assisted turning with lower complexity, and with reduced range reduction and tire wear. Example embodiments may provide such betterment by enabling strategic control of either or both of positive and negative torque applied to the inside rear wheel during a turn. In this regard, for example, a target speed for the inside rear wheel may be calculated to ensure that the wheel keeps turning when appropriate (to reduce tire wear), while also considering the possibility of influencing or considering brake wear. By setting a target speed for the rear inside wheel during a turn, feedback may be measured and monitored to ensure that the target speed is maintained in a sort of a feedback loop that can be managed in real time. Thus, the user experience during the application of the turning radius reduction may also be superior. Example embodiments may therefore provide strategic control of the application of torque (either or both of positive and negative torques) through a wheel speed management technique to achieve turning radius reduction in terms both of the quantitative changes to the turning radius itself, and also the qualitative changes that are associated with the experience of employing the strategy.

Some example embodiments may therefore provide a system that is not only capable of providing reductions in vehicle turning radius, but is further capable of doing so in an automatic fashion that seamless for the driver. In this regard, for example, when enabled by the driver, a controller of the system of example embodiments may be configured to automatically determine a target speed for a rear inside wheel during a tight turn, and apply positive and/or negative torque to the inside rear wheel during the turn to maintain the target speed.

Figure 1:
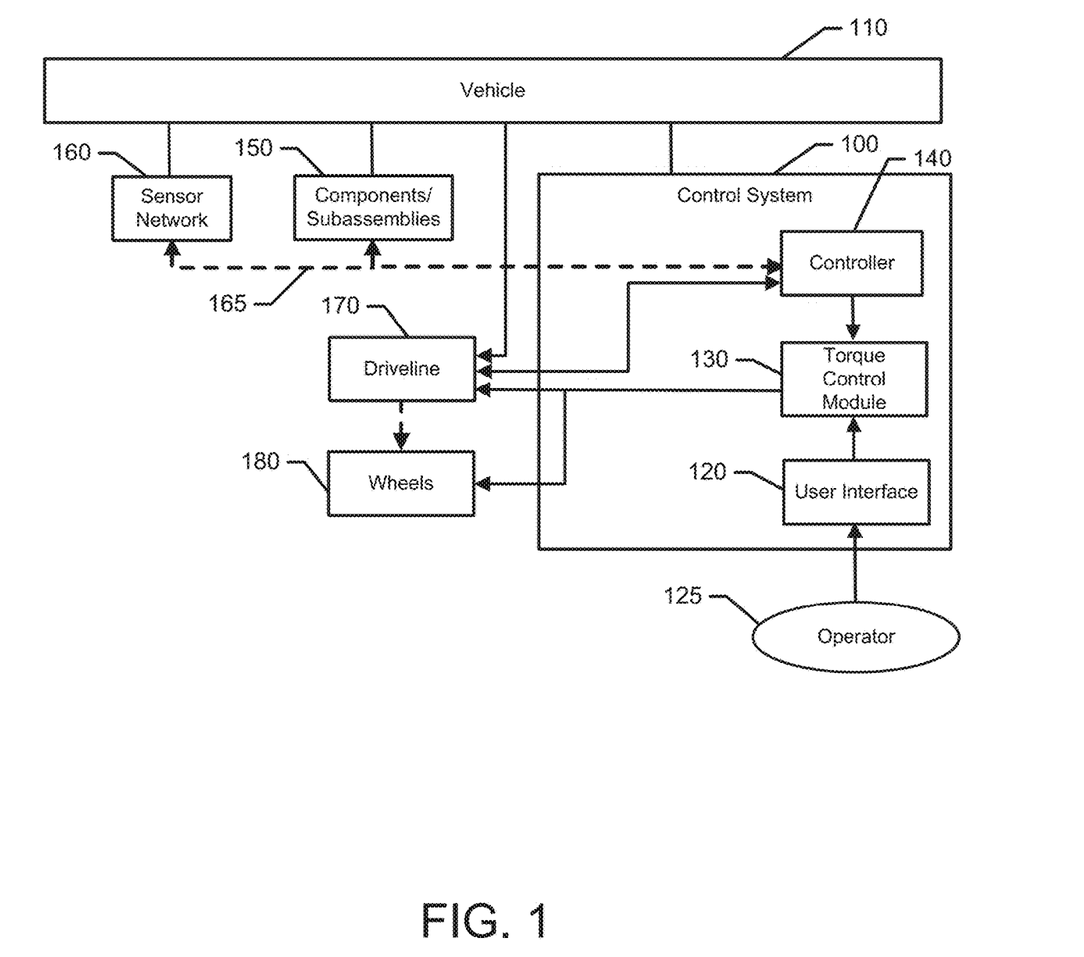
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals and the steering wheel (or hand wheel). The pedals may include a brake pedal and a throttle (e.g., a gas or other speed control pedal) pivotally mounted to the floor of the vehicle 110, and operable by an operator 125. The brake pedal may generally be used to provide inputs for control of braking torque, and the speed control/gas pedal may be used to provide inputs for control of propulsive torque. However, the normal mode of operation may not be desirable for all cases. Moreover, selectable other modes of operation, including one or more off-road driver assistance modes, parking modes, turn assist modes, etc., may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include a turn assist mode, in which turn radius reduction may be initiated as described in greater detail below.

Of note, although the term turn assist mode will generally be referred to herein as being the mode in which example embodiments are performed, the name of the mode in which example embodiments may be applied is not important, and certainly not limiting. As noted above, other terms like brake-steering mode, parking mode, or any other mode in which the functionality described herein is applied, are also possible.

The control system 100 of example embodiments may also include the torque control module 130, which may be part of or otherwise operably coupled to a controller 140. The torque control module 130 may be configured to determine positive torque (e.g., propulsive torque) and/or negative torque (e.g., brake torque, regenerative torque, etc.) to be applied to the wheels, individually, in pairs or collectively (e.g., depending on driveline state and/or vehicle type) as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 110. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, the steering wheel of the vehicle, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. In some cases, the brake assembly may include an electric brake boost (EBB) system, which uses electric brake boosters to sense driver input and reduce the amount of pedal pressure needed for braking. The propulsion system may include a gas engine, electric motor, or any other suitable propulsion device. Thus, example embodiments may apply to electric vehicles (EVs), hybrid electric vehicles (HEV), battery electric vehicle (BEV), internal combustion engine (ICE) vehicles, and/or the like.

The controller 140 and/or torque control module 130 may be configured to determine positive and negative torque inputs for provision to components of a driveline 170 (e.g., driveshaft, differential(s), axle shaft(s), etc.) and wheels 180 of the vehicle 110. Thus, for example, the torque control module 130 may determine positive torque inputs for provision to the propulsion system to apply propulsive torque to the wheels 180 of the wheel assembly of the vehicle 110 via the driveline 170, and determine negative torque inputs for provision to the wheels 180 in the form of braking torque, regenerative torque, or the like. Moreover, one or more corresponding sensors of the sensor network 160 that may be operably coupled to the brake assembly and/or the wheel assembly may provide information relating to brake torque, brake torque rate, vehicle velocity, vehicle rate of change of velocity, individual wheel speeds, front/rear wheel speeds, vehicle pitch/yaw, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, steering wheel angle, speed, etc.) relative to control of various aspects of operation of the vehicle 110 and then be configured to use the information received in association with the execution of one or more control algorithms that may be used to provide instructions to the torque control module 130 in order to control application of positive and negative torque to the wheels of the wheel assembly of the vehicle 110.

In an example embodiment, the operator 125 may use the user interface 120 to select the turn assist mode. The user interface 120 may be embodied by an interactive display in the vehicle 110, and may therefore be a soft switch provided on the display. However, in other examples, the user interface 120 may include a hard switch, a button, key, or other selectable operator located in the cockpit of the vehicle 110. Selection of the turn assist mode may correspondingly activate the torque control module 130 to provide the automated turning control described herein based on information provided by the components or subassemblies 150 and/or corresponding sensors of the sensor network 160. More specifically, selection of the turn assist mode may enable control of turning capabilities based on vehicle speed, steering wheel position, and a control of positive and/or negative torque to an inner rear wheel, while controlling wheel speed to be a target speed as discussed in greater detail below. Operation of the torque control module 130 will be described in greater detail below in reference to FIG. 2.

As noted above, when the torque control module 130 is active, and automated turning controls have been activated, outputs of the torque control module 130 may be provided to components of the driveline 170 of the vehicle 110. The controller 140 may therefore receive information to enable the controller 140 to determine a state of the driveline 170 of the vehicle 110, or the specific driveline characteristics for the type of vehicle involved may be programmed into the algorithms that are executable by the controller 140. The driveline 170 may include front and rear axles and various drive components for the front and rear axles and/or the components that provide coupling therebetween. Thus, for example, the driveline 170 may include a differential (e.g., a front differential for a front wheel drive vehicle) and gears and/or clutch components that operably couple the front and rear axles (and/or their driving components). In some examples, such as when the vehicle 110 is a BEV, the driveline 170 may include individual electric motors for either each axle or even each wheel.

Figure 2:
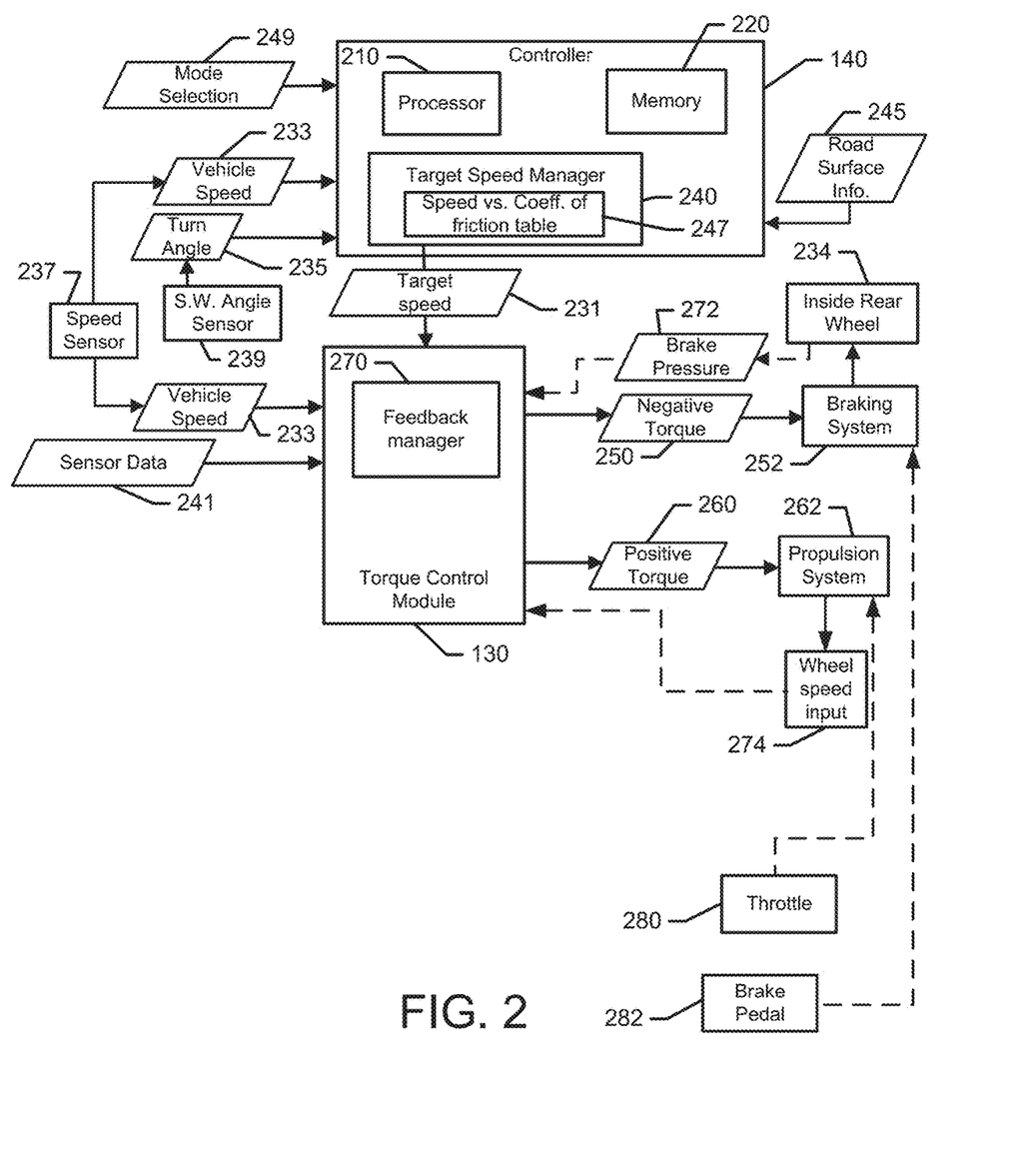
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of torque applied at the wheels of the vehicle 110 (e.g., individually or in pairs). The torque control module 130 may itself be a control algorithm, or may include control algorithms in the form of functional modules (or submodules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., including its own corresponding processing circuitry).

In an example embodiment, the controller 140 may include firmware or software enabling the controller 140 to determine a target speed 231 based on a vehicle speed 233 and a turn angle 235. In some embodiments, the vehicle speed 233 may be one or more wheels speeds, an average thereof, or a speed of the vehicle 110 itself, among other options. The vehicle speed 233 may be provided by a speed sensor 237 of the sensor network 160. The turn angle 235 may be a steering wheel angle or other such angle relating to the turn rate being requested or achieved by the vehicle 110. In some embodiments, the turn angle 235 may be provided by a steering wheel angle sensor 239 of the sensor network 160. The sensor network 160 may also provide other sensor data 241, which will be described in greater detail below.

In an example embodiment, the controller 140 may determine the target speed 231 via an algorithm or other programmed component or module that may be configured accordingly. In this regard, for example, the controller 140 may include or otherwise be operably coupled to a target speed manager 240. The target speed manager 240 may determine the target speed 231 only when a mode selection 249 has been made to place the vehicle 110 (e.g., via its controller 140) in the turn assist mode (or other similar mode), and when certain other qualifying conditions have been met (e.g., a trigger event or trigger condition). The target speed manager 240 may determine the target speed 231 based on determining the trigger event (e.g., a tight turn event) based on vehicle speed 233 being below a threshold speed, and the turn angle 235 being above a threshold angle. When these trigger conditions are met (and the mode selection 249 is made), the controller 140 may generate the target speed 231 based further on road surface information 245, which may also be provided via the sensor network 160.

Although other methodologies may be employed, in some embodiments, the target speed manager 240 may determine the target speed 231 based on a functionally defined program and/or a table(s) that may include corresponding values for the target speed 231 based on the road surface information 245 and/or the other inputs to the controller 140. In some embodiments, the road surface information 245 may be or include a coefficient of friction of the road or surface upon which the vehicle 110 is operating. Thus, for example, the target speed manager 240 may determine the target speed 231 based on a speed versus coefficient of friction table 247 stored in the memory 220 or otherwise accessible to the target speed manager 240.

In an example embodiment, the torque control module 130 may be configured to implement the target speed 231 with respect to an inside rear wheel 234 for a given turn that met the trigger condition. In this regard, the torque control module 130 may apply a selected torque to the inside rear wheel 234, which may in some cases be a negative torque 250 applied to a braking system 252 of the vehicle 110. Thus, the torque control module 130 may define the negative torque 250 value for application to the inside rear wheel 234 (e.g., via a braking system 252 of the vehicle 110) to generate increased yaw for the vehicle 110 during a turn, and to slow the speed of the inside rear wheel 234 to the target speed 231.

In some cases, braking (i.e., negative torque 250) may exclusively be used to implement the invention. However, the torque control module 130 may also provide a positive torque 260 via propulsion system 262 to the inside rear wheel 234 and/or other wheels of the vehicle 110 in some embodiments. Moreover, in some situations, the controller 140 may intelligently select between times when one option (exclusive use of negative torque) or the other (i.e., using negative torque in combination with positive torque) should be selected for use. Thus, the torque control module 130 may, in some cases, manage or balance the provision of positive torque 260 and negative torque 250 to achieve the target speed 231. Moreover, in some embodiments, a closed feedback loop may be defined whereby a feedback manager 270 may receive a brake pressure 272 input and/or wheel speed input 274 from other wheels in order to manage the provision of the target speed 231 throughout the turn instead of providing a single discrete input at the beginning of the turn.

In examples where both approaches are options, the controller 140 may determine which option to select based on various conditions onboard the vehicle 110. For example, if the vehicle 110 is an EV with a fully charged battery, healthy tire tread level, but worn out brake pads, it may be desirable to implement some use of positive torque to prevent reliance on braking to implement the tight turn. However, if the EV battery is depleted, tire tread levels are low, and brake pads are good, then exclusive use of braking may be used to implement the tight turn. Other options or strategies may also be defined for situational management of the strategy employed. Meanwhile inputs from the throttle 280 and brake pedal 282 may be arbitrated or offset while the torque control module 130 is actively controlling the vehicle 110 in a turn. In this regard, for example, the torque control module 130 may release control of torque for purposes of achieving the target speed 231 responsive to an input from either or both of the throttle 280 or brake pedal 282 that indicates a desire of the operator 125 to override the situation and take an updated or new course of action.

The sensor data 241 of some embodiments may include data that also or alternatively interrupts operation of the torque control module 130 for achievement of the target speed 231. In this regard, for example, the feedback manager 270 may receive the sensor data 241, which may indicate the presence of an obstacle nearby or otherwise in proximity to the vehicle 110. The obstacle may be a living or non-living object to which maintaining a gap or distance is desired during the tight turn, and has been perceived by the vehicle 110. In this regard, for example, the sensor network 160 may include a camera, sonar, radar, lidar or other on-board sensors that may indicate the presence of the obstacle. The obstacle may also or alternatively be located via GPS position information, map data (stored or online), or via external communication. As an example, either vehicle-to-vehicle (V2V) or vehicle-to-infrastructure (V2I) communication may be used to communicate the location or position of obstacles in either general terms or relative terms with respect to the vehicle 110.

In some embodiments, the sensor data 241 may include data indicative of brake pad status (or wear condition). In this regard, the sensor data 241 may continue to be provided to enable the torque control module 130 to operate normally as described above except when the brake pad status indicates that the brake pads are worn down below a threshold wear level, or are otherwise currently hot and should not be used for generation of the target speed 231. An indication of the status may then be communicated to the operator 125, e.g., via the user interface 120.

Figure 3:
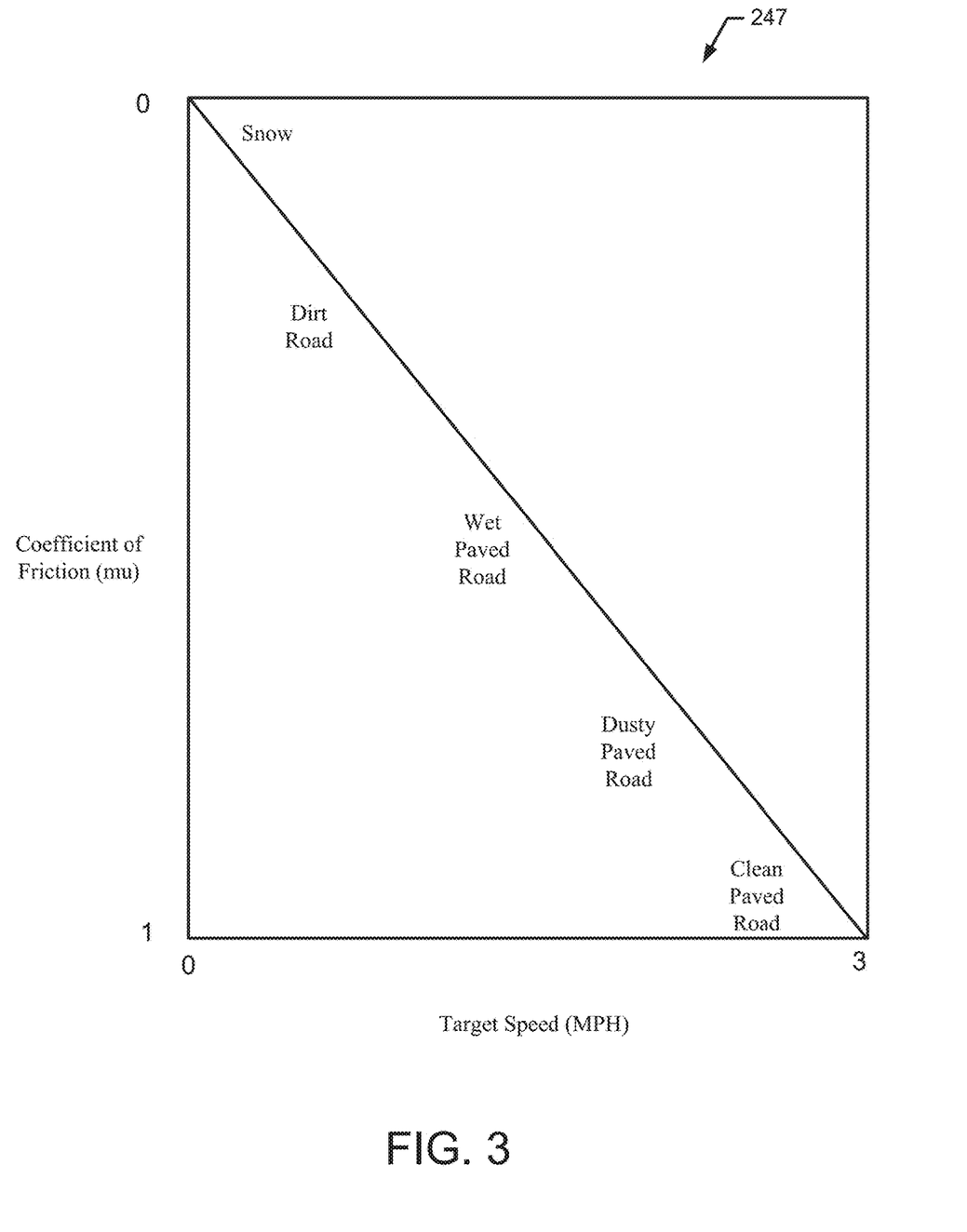
FIG. 3 illustrates a vehicle performing a reduced radius turn in accordance with an example embodiment.

As noted above, a table may be used in some cases to generate the target speed 231. FIG. 3 illustrates an example of the speed versus coefficient of friction table 247 mentioned above in accordance with an example embodiment. As shown in FIG. 3, the table 247 may plot a coefficient of friction (mu) for the wheels against the target speed (in miles per hour (MPH)) for each of various different road conditions. The road conditions themselves (i.e., road surface information 245 (or driving surface information more generically to include when not operating on a road) may be determined by various sensors of the sensor network 160 using onboard vehicle sensors or devices and/or external assets. For example, cameras, audio sensors (e.g., microphone, electro-acoustic transducer and/or the like), moisture or precipitation sensors, or location information associated with corresponding weather information may be used for this purpose.

When location information is used, the location information may be obtained via GPS position information, or other location information sources. Association of the location with a road surface type (or driving surface type if not associated with a road) may be made based on map data (stored or online) and/or the like, or on external communication. Association of a location with a condition of the road surface type may further be made based on online weather information that may be retrieved based on the location information. Thus, for example, the road surface type and the condition of the driving surface (based on the weather and stored map data) may be made. When external communication is involved, as noted above, the external communication may include V2V and V2I communication, which may be used to share road surface information 245 to vehicles that may pass along the same stretch of road within a given period of time.

In some embodiments, road surface information 245 may have a time based relevancy component that makes old data weigh less in connection with target speed 231 determinations and, if data is old enough, a new calculation may be made to generate an updated road surface information entry for use by the target speed manager 240. Thus, for example, if a vehicle is in a selected operational mode that provides automatic assistance for tight turning capability, road surface type may be determined (either responsive to the trigger condition or preemptively). The augmentation of that road surface type (which may not vary with time) based on time variant weather or other transient conditions may be made based on a check of recent reports of such conditions from other vehicles (or the same vehicle) that have been received within a given period of time. If recent enough, such recent reports may be credited as valid and used with or without confirmation from onboard sensors. However, if older than a threshold amount of time, the road surface information 245 may require update using onboard sensors and/or external communication with external services as described above.

Figure 4:
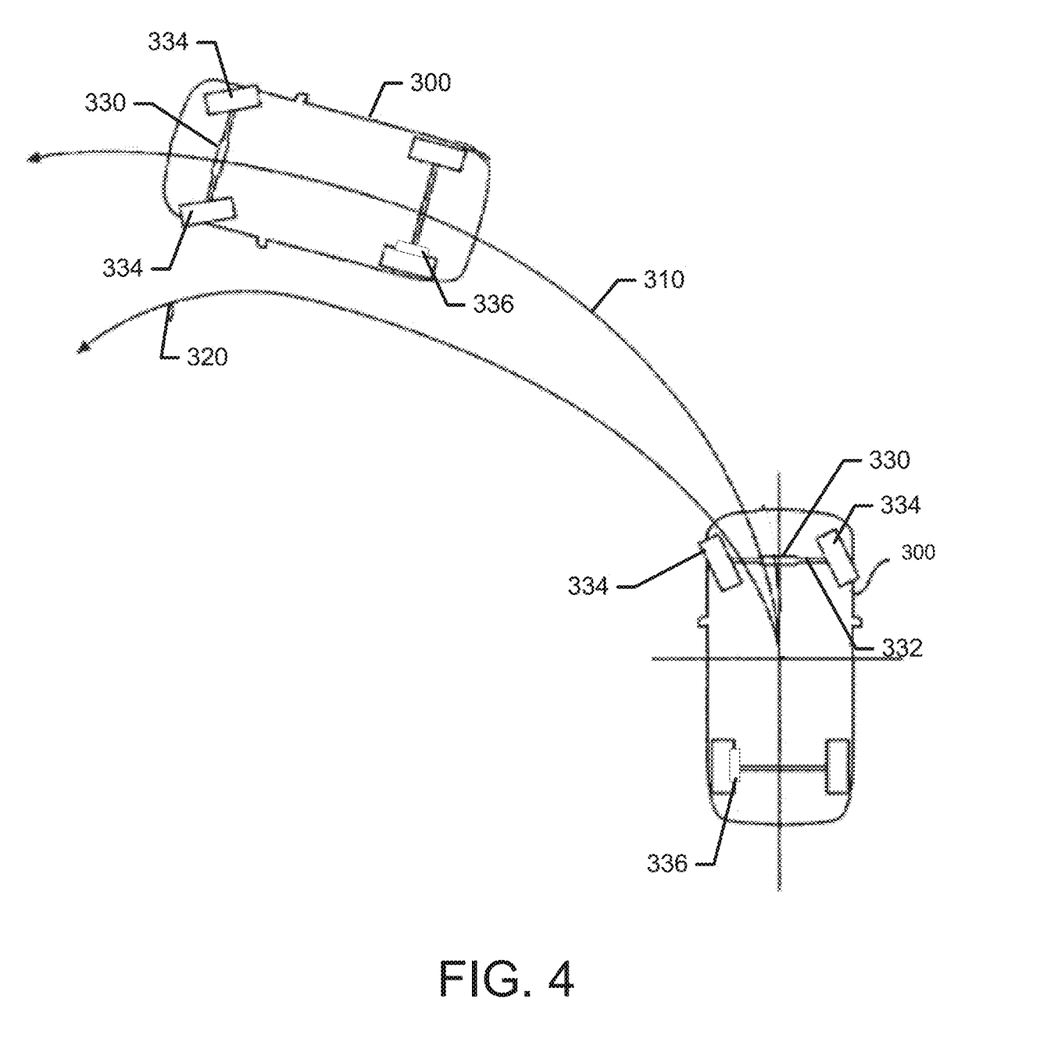
FIG. 4 illustrates a control flow diagram for providing a tight turn based on road surface information in accordance with an example embodiment.

Of note, the propulsion system 262 of the vehicle could take numerous different forms. FIG. 4 illustrates a general example that may apply to multiple such forms that could be taken in some example embodiments. Referring to FIG. 4, a front wheel drive vehicle 300 (as one example of vehicle 110) is shown while conducting a turn. A normal (unmodified) turn radius 310 is shown for comparison to a modified turn radius 320.

The front wheel drive vehicle 300 has a front differential 330 and front axle 332 to which front wheels 334 are attached. Power from a drive shaft of the front wheel drive vehicle 300 is provided to the front wheels 334 responsive to the positive torque 260 discussed above, while the negative torque 250 value is provided in inside rear brake 336. The modified turn radius 320 illustrates the expected decrease in turn radius that can be expected by applying the negative torque value 232 to the inside rear wheel 340 during the turn. Of note, the target speed 231 that is applied to the inside rear wheel is not a direct competition or balance of positive and negative torque values applied at the inside rear wheel, but it could be as would be the case, for example with a BEV having two rear electric motors (one for each wheel) and corresponding wheel end brakes at each wheel. These and other examples will also be apparent to those of skill in the art, since example embodiments may alternatively be practiced for rear wheel drive, all-wheel drive, and all electric vehicle alternatives.

Figure 5:
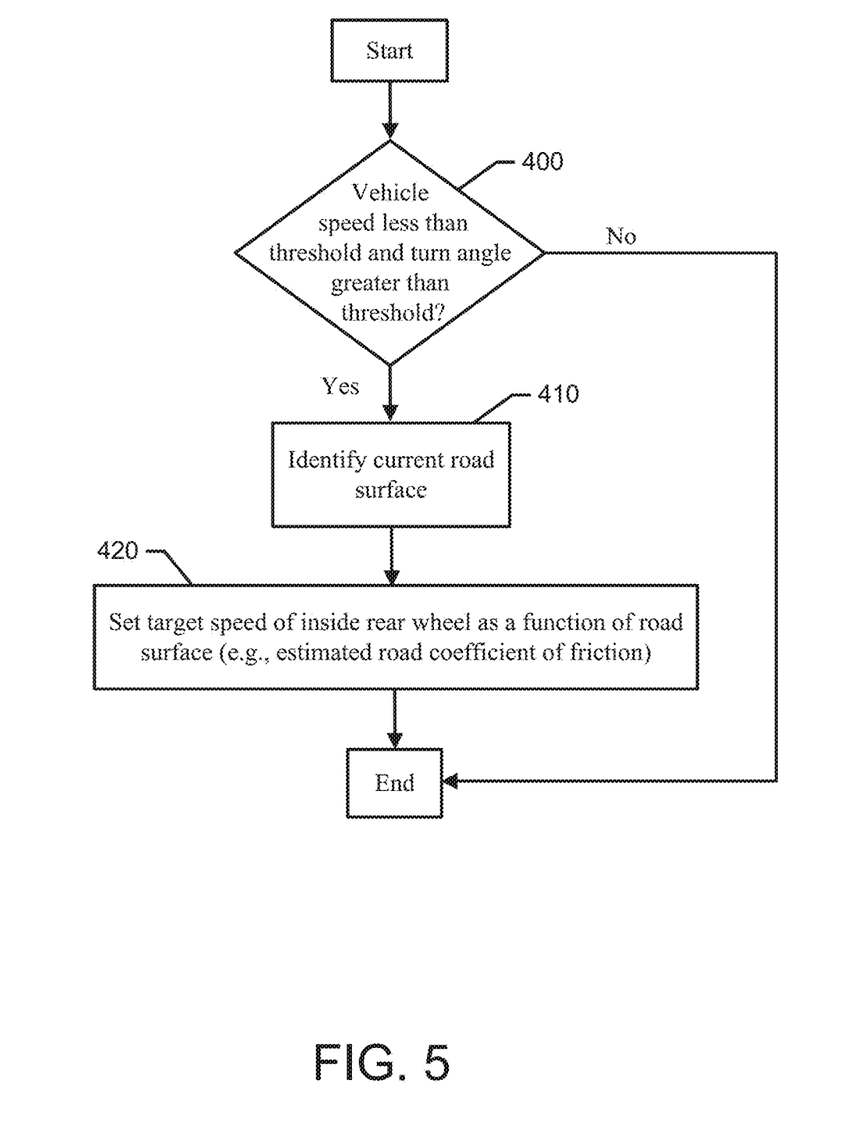
FIG. 5 illustrates a plot of coefficient of friction versus target speed in accordance with an example embodiment.

FIG. 5 illustrates control flow associated with providing a turn radius reduction in accordance with an example embodiment. In this regard, vehicle speed may initially be determined along with turn angle to make a determination at operation 400. The determination made may be, for example, if either of the vehicle speed is not less than a threshold speed or the turn angle is not greater than a threshold angle, the control flow will immediately terminate. If, on the other hand, both the vehicle speed is less than the threshold speed and the turn angle is greater than the threshold angle, then flow may continue to operation 410. At operation 410, the current road (or driving) surface may be identified including its current status. As noted above, and shown in FIG. 4. The status may include the type of surface or its paved/unpaved status, along with an indication of any further modification to the type of surface that is temporary based, for example, on weather or other transient conditions. Thereafter, at operation 420, a target speed may be set for the inside rear wheel as a function of the road surface (and its current condition). The road surface, and its current condition may be characterized, for example, in the form of an estimated road coefficient of friction.

Figure 6:
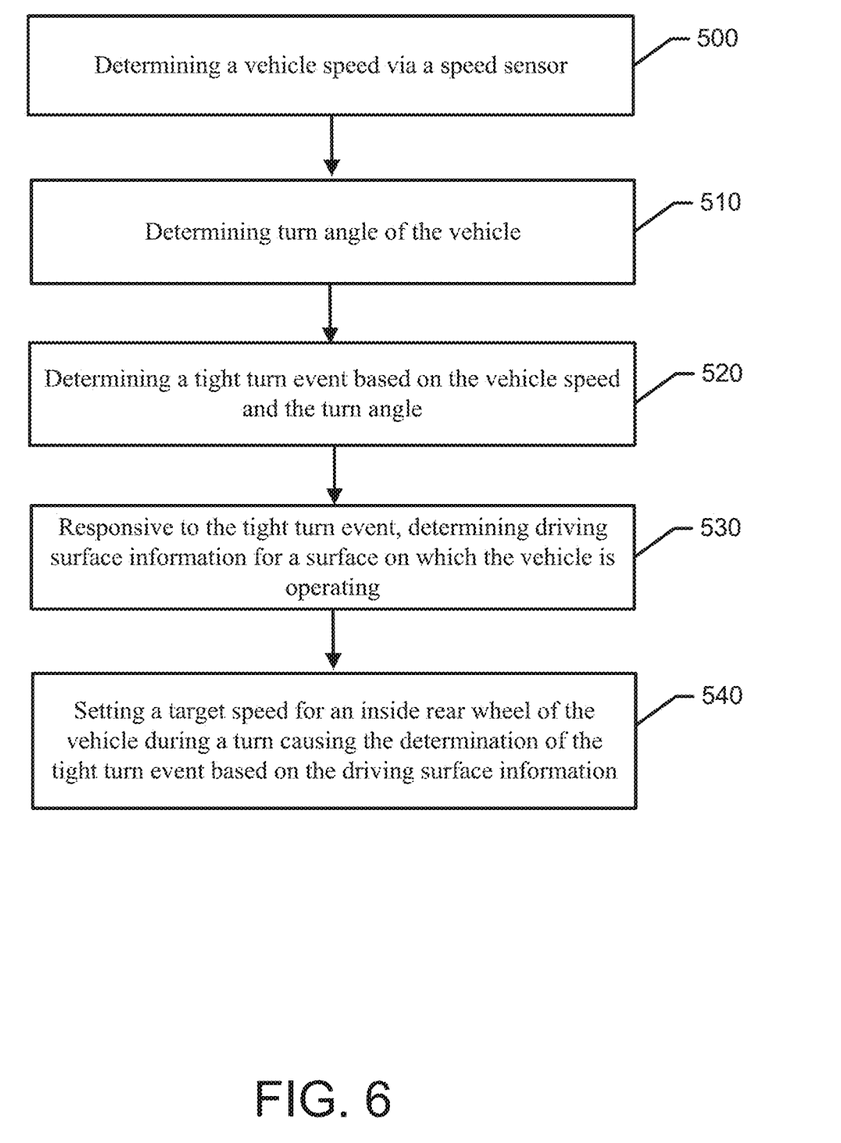
FIG. 6 illustrates a method of controlling a vehicle in accordance with an example embodiment.

FIG. 6 illustrates a block diagram of one example method of providing automated application of turn radius reduction in a driver assist mode. The method may include determining a vehicle speed via a speed sensor at operation 500 and determining turn angle of the vehicle at operation 510, determining a tight turn event based on the vehicle speed and the turn angle at operation 520. The method may further include, responsive to the tight turn event, determining driving surface information for a surface on which the vehicle is operating at operation 530, and setting a target speed for an inside rear wheel of the vehicle during a turn causing the determination of the tight turn event based on the driving surface information at operation 540.

Example embodiments may therefore also include a vehicle control system for reducing turn radius of a vehicle, which may include a speed sensor to determine a vehicle speed, a steering angle sensor to determine turn angle, and a controller. The controller may be operably coupled to the speed sensor and the steering angle sensor to determine a tight turn event based on the vehicle speed and the turn angle. The controller may also, responsive to the tight turn event, determine driving surface information for a surface on which the vehicle is operating, and set a target speed for an inside rear wheel of the vehicle during a turn causing the determination of the tight turn event based on the driving surface information.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the tight turn event may be determined responsive to both the vehicle speed being less than a threshold vehicle speed and the turn angle being greater than a threshold turn angle. In an example embodiment, determining the driving surface information may include determining a surface coefficient of friction on which the vehicle is operating. In some cases, determining the surface coefficient of friction comprises utilizing an onboard vehicle sensor to determine the surface coefficient of friction. In an example embodiment, the onboard vehicle sensor may include a camera, audio sensor (e.g., microphone, electro-acoustic transducer and/or the like) or a precipitation sensor. In some cases, determining the surface coefficient of friction may include utilizing location information with corresponding previously recorded road surface information associated with the location information to determine the surface coefficient of friction. In an example embodiment, the location information may be provided by satellite or global positioning system information. In some cases, setting the target speed for the inside rear wheel of the vehicle may include monitoring wheel speed in real time and applying a brake torque to the inside rear wheel of the vehicle to achieve the target speed. In an example embodiment, setting the target speed for the inside rear wheel of the vehicle may include applying a selected torque to the inside rear wheel of a four wheel drive, a front wheel drive vehicle or a rear wheel drive vehicle. In some cases, setting the target speed for the inside rear wheel of the vehicle may include applying a friction brake to the inside rear wheel of an ICE powered vehicle. In an example embodiment, setting the target speed for the inside rear wheel of the vehicle may include applying a positive or negative torque to the inside rear wheel of an electric vehicle or hybrid electric vehicle. In some cases, the controller may be configured to control vehicle operation in any of a plurality of operator selectable modes of operation, and determining the tight turn event may be performed in a selected one of the plurality of operator selectable modes of operation. In an example embodiment, the system may further include a sensor network, and the sensor network may provide information indicative of a brake pad status. In such a case, the selected one of the plurality of operator selectable modes of operation may be disabled responsive to the brake pad status indicating brake wear greater than a threshold wear level. In some cases, the sensor network may further detect an obstacle within a predetermined distance of the vehicle, and in response to detecting the obstacle, the target wheel speed may be modified based on proximity to the obstacle. In an example embodiment, the sensor network may include a camera, radar, sonar, lidar or communication equipment for vehicle-to-vehicle, or vehicle-to-infrastructure communication to determine proximity of the obstacle to the vehicle. Setting the target speed for the inside rear wheel of the vehicle may include applying a friction brake to the inside rear wheel of an ICE powered vehicle, or applying a positive or negative torque to the inside rear wheel of an EV, BEV or HEV.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system for reducing turn radius of a vehicle, the system comprising: a speed sensor to determine a vehicle speed; a steering angle sensor to determine turn angle; and a controller operably coupled to the speed sensor and the steering angle sensor to: determine a tight turn event based on the vehicle speed and the turn angle, responsive to the tight turn event, utilize an onboard vehicle sensor to determine driving surface information for a surface on which the vehicle is operating, and set a target speed for an inside rear wheel of the vehicle during a turn causing the determination of the tight turn event based on the driving surface information, wherein setting the target speed for the inside rear wheel of the vehicle comprises normal balancing of an application of a positive torque and a negative torque to the inside rear wheel of the vehicle, wherein additional balancing of the application of the positive torque and the negative torque from the normal balancing is applied based on brake pad wear and electric vehicle battery charge, and wherein responsive to the brake pad wear being greater than a brake pad wear threshold, the additional balancing is applied by the application of the positive torque being increased relative to the application of the negative torque.

2. The system of claim 1, wherein the tight turn event is determined responsive to both the vehicle speed being less than a threshold vehicle speed and the turn angle being greater than a threshold turn angle.

3. The system of claim 1, wherein determining the driving surface information comprises determining a surface coefficient of friction on which the vehicle is operating.

4. The system of claim 1, wherein the onboard vehicle sensor comprises a camera, audio sensor, or a precipitation sensor.

5. The system of claim 3, wherein determining the surface coefficient of friction comprises utilizing location information with corresponding previously recorded road surface information associated with the location information to determine the surface coefficient of friction.

6. The system of claim 5, wherein the location information comprises satellite or global positioning system information.

7. The system of claim 1, wherein setting the target speed for the inside rear wheel of the vehicle comprises monitoring wheel speed in real time and applying a brake torque to the inside rear wheel of the vehicle to achieve the target speed.

8. The system of claim 1, wherein setting the target speed for the inside rear wheel of the vehicle comprises applying a friction brake to the inside rear wheel of an internal combustion engine (ICE) powered vehicle.

9. The system of claim 1, wherein setting the target speed for the inside rear wheel of the vehicle comprises applying a positive or negative torque to the inside rear wheel of an electric vehicle or hybrid electric vehicle.

10. The system of claim 1, wherein the controller is configured to control vehicle operation in any of a plurality of operator selectable modes of operation, and
wherein determining the tight turn event is performed in a selected one of the plurality of operator selectable modes of operation.

11. The system of claim 10, further comprising a sensor network, wherein the sensor network determines a brake pad status, and wherein the selected one of the plurality of operator selectable modes of operation is disabled responsive to the brake pad status indicating brake wear greater than a threshold wear level.

12. The system of claim 11, wherein the sensor network further detects an obstacle within a predetermined distance of the vehicle, and
wherein in response to detecting the obstacle, the target wheel speed is modified based on proximity to the obstacle.

13. The system of claim 12, wherein the sensor network comprises a camera, radar, sonar, lidar or communication equipment for vehicle-to-vehicle, or vehicle-to-infrastructure communication to determine proximity of the obstacle to the vehicle.

14. A method for reducing turn radius of a vehicle, the method comprising:
determining a vehicle speed via a speed sensor;
determining turn angle of the vehicle;
determining a tight turn event based on the vehicle speed and the turn angle;
responsive to the tight turn event, determining driving surface information for a surface on which the vehicle is operating; and
setting a target speed for an inside rear wheel of the vehicle during a turn causing the determination of the tight turn event based on the driving surface information, wherein setting the target speed for the inside rear wheel of the vehicle comprises normal balancing of an application of a positive torque and a negative torque to the inside rear wheel of the vehicle,
wherein additional balancing of the application of the positive torque and the negative torque from the normal balancing is applied based on brake pad wear and electric vehicle battery charge, and
wherein responsive to the electric vehicle battery charge being lower than a battery charge threshold, the additional balancing is applied by the application of the negative torque being increased relative to the application of the positive torque.

15. The method of claim 14, wherein determining the driving surface information comprises determining a surface coefficient of friction on which the vehicle is operating.

16. The method of claim 15, wherein determining the surface coefficient of friction comprises utilizing an onboard vehicle sensor to determine the surface coefficient of friction, or
 wherein determining the surface coefficient of friction comprises utilizing location information with corresponding previously recorded road surface information associated with the location information to determine the surface coefficient of friction.

17. The method of claim 14, wherein setting the target speed for the inside rear wheel of the vehicle comprises monitoring wheel speed in real time and applying a brake torque to the inside rear wheel of the vehicle to achieve the target speed.

18. A vehicle control system for reducing turn radius of a vehicle, the system comprising:
 a speed sensor to determine a vehicle speed;
 a steering angle sensor to determine turn angle; and
 a controller operably coupled to the speed sensor and the steering angle sensor to:
  determine a tight turn event based on the vehicle speed and the turn angle,
  responsive to the tight turn event, determine driving surface information for a surface on which the vehicle is operating, and
  set a target speed for an inside rear wheel of the vehicle during a turn causing the determination of the tight turn event based on the driving surface information,
 wherein setting the target speed for the inside rear wheel of the vehicle comprises normal balancing of an application of a positive torque and a negative torque to the inside rear wheel of the vehicle,
 wherein additional balancing of the application of the positive torque and the negative torque from the normal balancing is applied based on brake pad wear and electric vehicle battery charge,
 wherein responsive to the brake pad wear being greater than a brake pad wear threshold, the additional balancing is applied by the application of the positive torque being increased relative to the application of the negative torque, and
 wherein responsive to the electric vehicle battery charge being lower than a battery charge threshold, the additional balancing is applied by the application of the negative torque being increased relative to the application of the positive torque.

* * * * *